Oct. 22, 1963  
D. SCARAMUCCI  
3,107,685  
MUD VALVE WITH REMOVABLE HEAD AND SEAT  
UNIT INTERLOCKING THE BONNET  
Filed Aug. 1, 1961  
5 Sheets-Sheet 5

INVENTOR  
DOMER SCARAMUCCI  
BY Fred.E. Shoemaker,  
Fred L. Witherspoon, Jr.  
ATTORNEYS

United States Patent Office 3,107,685
Patented Oct. 22, 1963

3,107,685
MUD VALVE WITH REMOVABLE HEAD AND SEAT UNIT INTERLOCKING THE BONNET
Domer Scaramucci, P.O. Box 9125, Oklahoma City, Okla.
Filed Aug. 1, 1961, Ser. No. 129,208
30 Claims. (Cl. 137—327)

This invention relates to valves, some forms of which are known in the well-drilling jargon as mud-valves, and deals with valves usable, among other purposes, for controlling the flow of abrasive carrying fluids supplied at high pressure to the hollow stems of rotary rock and earth drills for cooling and lubricating the components thereof and for washing away and carrying out the cuttings by lifting them in the annular space surrounding the drill stem and between it and the walls of the bore or of a casing therein. Well drilling fluids serve many purposes and some of the components of the mixture, at least after recirculation, comprise sizable particles of hard material, abrasive in character and extremely detrimental to valves and valve seats that are used in the line between the high pressure pump and the drill stem.

It is one of the purposes of the present invention to provide a novel and improved mud valve, one that is simple in construction, easy to use and operate, has a long life, is equipped with readily replaceable components and which has characteristics permitting it to seal against the flow of fluid under all circumstances without the application of excess closing force or so-called "bumping" action to close the same, and which does not rely on substantial deformation of large components of elastic material for its complete fluid tightness.

It is a general object of the present invention to provide novel types of valves.

More particularly it is an object of the invention to provide, in a valve, a removable seat-insert assembly introduced into an enlargement of the flow passage and held in position therein by the valve bonnet.

Still another object of the invention comprises the interlocking of the seat-insert assembly and the valve bonnet whereby on removal of the latter the former is withdrawn for inspection or replacement.

As a corollary of the previous object may be noted the provision of mechanism for expanding and contracting the insert laterally by restraining the latter at its lower end and the application or the removal therefrom of a force along its vertical axis by movement of the bonnet in the required direction.

Another important object of the invention consists in the provision of co-acting means on the body and the valve seat-insert assembly to align, fasten and seal the insert by mere manipulation of the bonnet.

Another, and extremely important object of the invention, comprises the arrangement of means for positive fluid flow shutoff, on the downstream side of the valve member, without the need for a secondary seal, by the use of a continuous ring of rubber co-operating with the metal seats in the insert and extending toward the surfaces of the valve member to afford a full circle, seal between the seat and the valve member.

Still another and very important object of the invention comprises the use of a fluid responsive lip along the upper configuration of the seat-insert assembly to be sealed by and prevent upstream fluid from migrating down the wall of the seat-insert assembly chamber in the valve housing and into the downstream outlet, whereby the valve does not permit seepage.

Still another object of the invention includes minor modifications of the valve seat assembly adapting it for use with valve members of the through-bore rotatable type instead of the gate type, thus simplifying the operating mechanism and permitting a substantial reduction in the overall height of the valve structure.

In keeping with the above object, the valve member may be of the cylindrical plug type or of the ball type, either style requiring only slight changes in the configuration of the cooperating faces of the metal rings in the insert for conformation with the rotatable member.

Among other important features of the invention may be enumerated the following:

(a) Provision in the gate construction to permit straddling of obstructions trapped in the seat cavity to allow full freedom of gate movement.

(b) Provision of a vent in the seat-insert to permit excess fluid residing in the cavity to escape during installation of the insert, and also to prevent the creation of a vacuum during insert removal.

(c) The provision of a second stem seal arrangement which remains idle under normal operation but prevents contamination of the lubricant in the screw housing should the main stem-seal fail.

(d) Means to divert fluid leaking through a damaged primary stem seal to the outside of the valve housing thereby eliminating pressure on the secondary stem seal and serving to keep the fluid from contaminating the lubricant.

(e) The provision of a sealing ring recessed in the conformed face of each metal wear-ring to co-operate with the surface of a rotatable valving member for sealing.

(f) The extension of the mass of resilient sealing material over the outer ends of the metal wear-rings to eliminate the need for grinding them to conform to the wall of the seat assembly well.

Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

Valves used to control such abrasive laden fluids as well drilling "mud," at relatively high pressures, are commonly called "mud valves" and while valves for controlling most other fluids reflect a broad variety and many types as best suited to the particular service conditions, the mud valve generally falls in the "gate valve" class, using a combination of metal and resilient rubber seal means to establish a closure. Metal seats serve to guide and support a metal gate as well as reinforce the rubber used to effect a seal with the gate at the extremely high pressures used. In general the gate may be defined as a solid plate having parallel faces and intended for fully opened or fully closed operation only. The seats are renewable and each includes resilient seals secured to the body thereof, and preferably the valve stem is of the inside rising screw type with either rigid or loose stem-to-gate connection. In most proven forms of mud valves at least a large portion of the fluid shut-off is effected by a lateral thrust exerted by fluid pressure in the line of flow and seal is partially obtained by this action on a portion of the downstream gate face, while final closure results through some deformative action of confined resilient material, by what may be termed a "mass flow" thereof.

The present invention seeks to improve the constructional features and hence the operating characteristics of mud valves of the type described whereby to prolong their life, increase their sealing action, reduce the amount of pressure necessary on the gate in closing and facilitate the replacement operation when it becomes necessary to substitute a new seat or insert-assembly, and for a better understanding of the invention reference should be had to the accompanying drawings.

With slight modifications, to be later described, many of the important features of the gate type valve can be incorporated in a simplified valve of the ball type, for the same or other uses with the benefits heretofore, and later to be, described.

Figure 1:
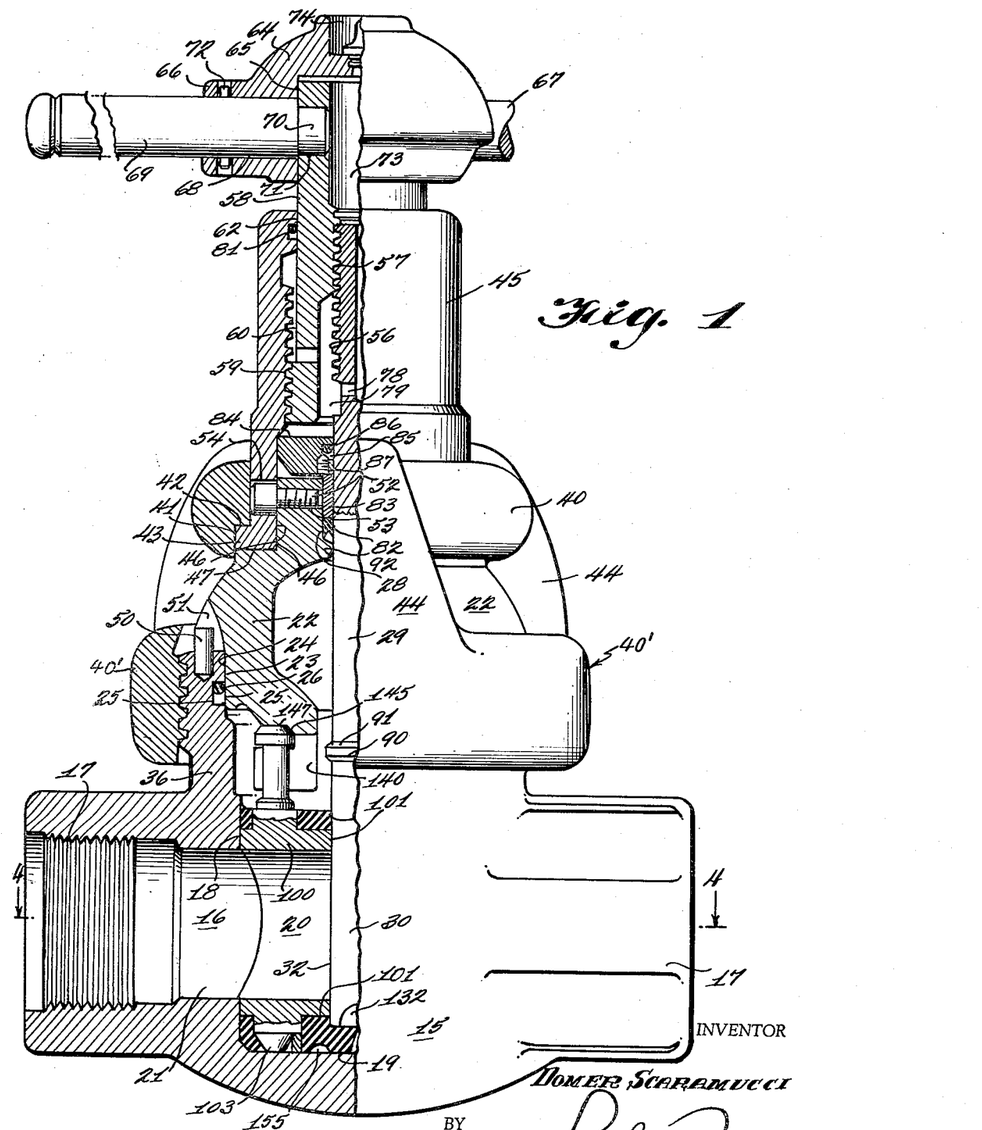
FIGURE 1 is a side elevation and partial longitudinal, vertical, central section of a valve incorporating the features of the invention, the gate being shown in the closed position.
Figures 2, 8:
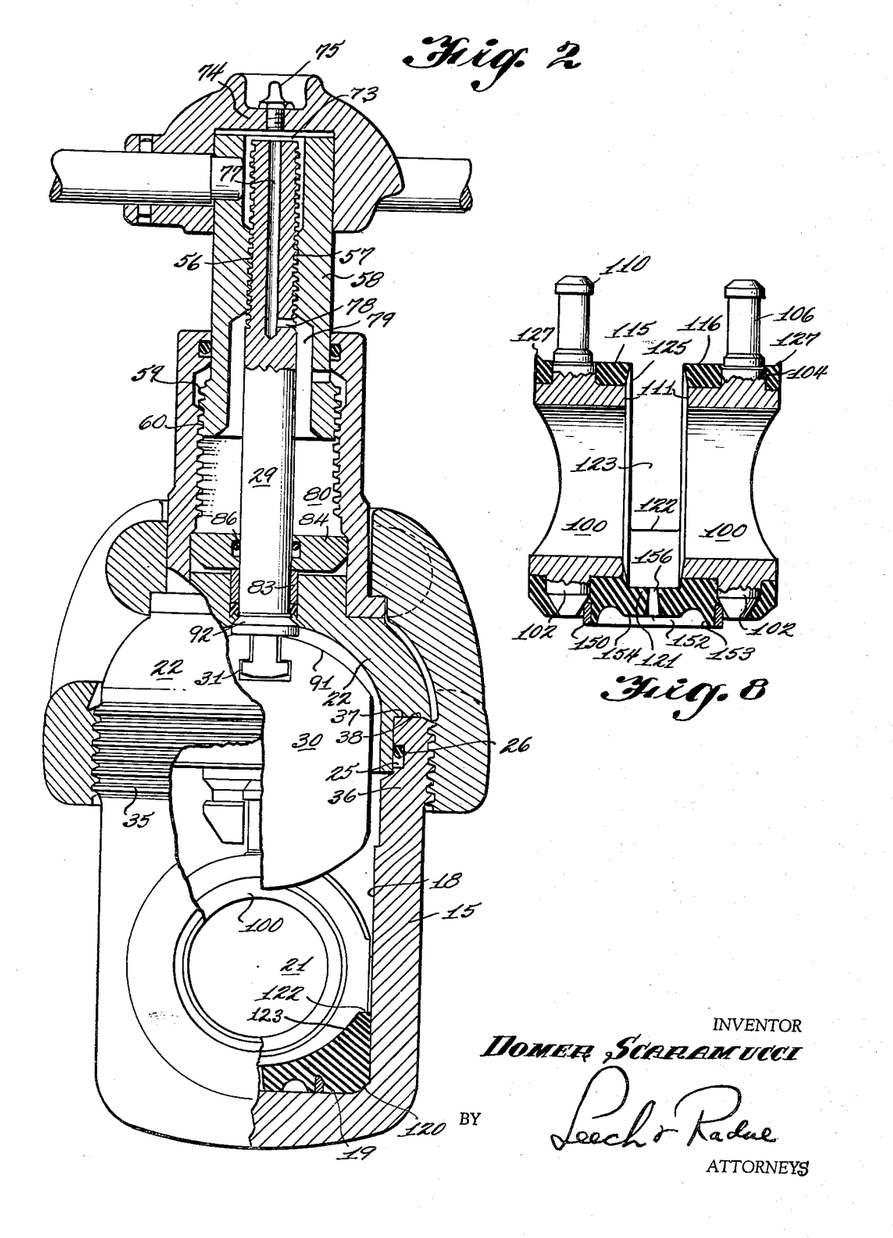
FIGURE 2 is a transverse, vertical central section through the mud valve showing the gate in full open position.
FIGURE 8 is a longitudinal, vertical, central section through the seat-insert assembly before installation or gate insertion showing the several sealing lips and other features.

Referring first to FIGURES 1 and 2, it will be seen that the valve, which is arranged for straight flow of the fluid and is of the gate type, includes a body 15 providing a straight flow passage 16 between the end coupling portions 17 thereof. At the mid-portion of the flow passage it is intersected by a vertical, cylindrical well or chamber 18 best seen in FIGURES 4 and 5 and adapted to accept through its open upper end the combination seat-insert assembly 20 provided with aligned co-axial bores 21 co-extensive with the flow passage 16 when properly positioned. The chamber 18 is closed at the bottom by an integral wall 19, flat except at the periphery where it is filleted to the cylindrical wall 18.

The seat-insert assembly is held in position in the valve body 15 by the bonnet 22 which has a cylindrical lower portion 23 received in the counter-bore 24 in the valve body coaxial with the chamber 18 receiving the insert. The wall of this bore 24 is provided with a circumferential channel or groove 25 in which is received an O-ring 26 serving to effect a fluid-tight seal between the valve body 15 and bonnet 22, which latter is closed at the top except for a co-axial bore 28 for the passage of stem 29 which serves to raise and lower gate 30 attached thereto by a rotatable connection 31 and adapted to be received in a channel 32 in the insert to close off flow through the passage 16 in a manner which will be later described.

FIGURE 1 shows the gate in the closed position and FIGURE 2 shows it fully elevated. The bonnet is secured in position on the housing by means of a windowed coupling element 34, internally threaded to engage over the external threads 35 on the housing spigot 36. The bonnet is limited in movement towards the housing by the shoulder 37 thereon engaging the flat upper end 38 of the spigot on the housing. The coupling 34 comprises upper and lower rings 40 and 40'; connected by circumferentially spaced verticals 44. The upper ring is counter-bored at 41 and transversely shouldered at 42 to engage over the radial flange 43 at the lower end of screw housing 45, which is internally and coaxially bored at 46 to engage over the cylindrical upward extension of the bonnet, whose reduced diameter produces the shoulder 47 against which the flange 43 abuts downwardly under the pull of the coupling 34 when it is tightened down.

In order to index and accurately position the bonnet and hold it against rotation relative to the housing the upper edge of spigot 36 has therein an indexing pin 50 which is closely received in a longitudinal slot 51 in that portion of the bonnet above its shoulder 37. To prevent relative rotation between the screw housing 45 and the bonnet the telescoping portions thereof are attached together by means of one or more indexing screws 52 the shanks of which are threaded into radial openings 53 in the neck of the bonnet near its upper end while the heads are received in loosely fitting radial bores 54 in the screw housing just above the flange 41 thereon.

To provide for raising and lowering the gate 30 the upper end of stem 29 is threaded as shown at 56, which threads co-operate with those at 57 in the axial bore in screw stem 58, a tubular member having an enlarged diameter at its lower end with external threads 59 co-operating with internal threads 60 in the screw housing 45. Thus, when the screw stem is rotated by mechanism, later to be described, movement of the stem is twice as rapid as would result from the single thread on the latter, which is of the same pitch as the thread of the housing, since on rotation of the screw stem 58 from the position shown in FIGURE 1 to that shown in FIGURE 2 it moves the distance afforded it in its threaded relation to the screw housing 45 while at the same time moving the stem in relation to the screw stem the amount afforded by the relative rotation between these two parts and the pitch of their threads, which produce a rapidly rising or lowering stem and does not require so much manipulation of the operating handles.

The screw stem 58 when in its lowermost position seen in FIGURE 1, protrudes considerably above the upper end of the screw housing 45, in which it is closely guided by the area 62 thereon, in order to receive on its upper end the hand wheel hub 64 concentrically bored as at 65 to have a close fit over the upper end of the screw stem as shown. The hub may be provided with a plurality of radial, integral arms 66 preferably three in number, two being adapted to permanently receive radial spokes or operating handles 67 which may be threaded or otherwise rigidly secured therein, and the third of which is drilled radially as at 68 to provide a close fit for the handle 69 which is removable from this bore and has on its inner end a tenon 70 adapted to be received closely in a bore 71 in the screw stem to lock the hand wheel hub thereto for rotation therewith. The removable handle 69 is adapted to be locked in position in the hand wheel by means of a spring pin 72 extending through aligned bores in the handle and in the spoke.

The hand wheel hub fits tightly on the screw stem, which has a large compartment 73 in its upper end, coaxial with and of greater diameter than the threads for the upper end of the stem, and this is closed at its upper end by portion 74 into which is fitted a nipple 75 adapted to receive a grease gun for lubricating the operating mechanism of the valve stem. For the purpose of distributing this grease, which may be supplied when the gate is either opened or closed, the compartment 73 connects directly with axial bore 77 opening through the upper end of the stem and connected at its lower end to the outer surface of the stem by the radial passage 78, which in the most elevated position of the stem still opens into the enlarged co-axial chamber 79 at the lower end of the screw stem and which is in open engagement with compartment 80 in the screw housing.

It will be noted that leakage of grease between the rising lowering screw stem and the screw housing is prevented by the O-ring 81 in an undercut channel near the upper end of the housing. The valve stem is protected against valve controlled fluid leakage longitudinally thereof through the bore 28 in the upper end of the bonnet by means of a circumferential packing 82 having a V-groove at its lower end whereby pressure expands the lips against the walls of the bore in which this packing is fitted and against the valve stem, the packing being held down by a metal bushing 83 which guides the stem and whose upper end is engaged by washer 84, which fits against the wall of the same counter-bore in the stem in the screw housing as is received over the upper extension 46 of the bonnet, for positioning these parts relative to each other. This washer is bored for the passage of the valve stem and is provided with an internal circumferential groove 85 to receive the secondary stem packing 86 in the form of an O-ring. Since this packing is hardly capable of withstanding the total pressure of the fluid flowing through the valve, should the latter leak through the primary stem packing 82 due to wear or defect therein, any such leakage will be handled by means of the bore 87 parallel to the stem bore in the washer and extending from the groove 85 therein towards the lower face which is spaced above the projection over which the lower end of the screw housing fits so that fluid may move out radially in this space and then through one or more of the bores 54 for the indexing screws 52 and thus to the outside, whereby it does not damage.

As a means for protecting both of the previously described stem seals, when the valve is opened, the stem 29 has formed thereon just above the gate 30 an enlargement 90 extending circumferentially thereabout and having the chamfered upper edge 91 adapted to seat in a correspondingly shaped counter sink 92 at the lower end of the stem bore in the bonnet. The metal-to-metal seal occurring when the stem is lifted until the enlargement 90 fits tightly in the counter-sink will relieve the pressure on both the main and secondary stem seals by keeping fluid away from them.

A reference to FIGURES 1, 2, 3, 6, 7 and 8 will give a clear picture of the construction of the seat-insert assembly. It is a composite unit including the two, tubular wear-rings 100 of steel or similar material. These are preferably castings, identical in construction and reversed in position in the assembly. Each has a cylindrical bore matching in diameter and aligned with end bores 16 in the valve housing, as best seen in FIGURE 1. The outer cylindrical surfaces 101 of the wear rings are interrupted at the top and bottom of each by radial projections integral therewith. Those projections 102 at the bottom are essentially cylindrical for slightly more than one-half of their length and then are provided with truncated, conical lower ends 103 as clearly seen in FIGURE 7.

The top projections have cylindrical base parts 104 of substantially the same diameter and length as those numbered 102 at the bottom. These are then reduced in diameter for a short distance but remain cylindrical as seen at 105 and then merge into stems 106 by means of tapers 107. As viewed in FIGURE 3 these are surmounted by heads 108 having cylindrical portions 109 and truncated terminal cones 110.

The inner ends of the wear rings are cut off at right angles to their axes forming the circular annuli 111 whose surfaces are plane to engage closely with the parallel outer walls 112 of the gate 30. The opposite or outer end wall of each of the wear rings is curved as at 113 to closely engage the annular wall 18 of the chamber in the valve body which receives the seat-insert assembly. The length of each wear ring 100 is such that, when assembled with their ends 113 bearing against the walls 18 of the chamber for the seat-insert assembly, the space between the faces 111 is substantially the same as that between the opposed faces 112 of the gate 30, whereby a slot just wide enough to receive the gate is available between the properly positioned wear rings. Reliance is not placed on the engagement between these faces 112 of the gate and those 111 of the wear rings and between the outer curved faces 113 of the wear rings and the walls of the chamber in which they fit to provide the sealing for the valve since the presence of grit and other small particles would shortly inhibit the effectiveness of such seals no matter how closely they were ground to dimensions. Actually the metal parts provide for guidance and positioning of the gate and transfer the thrust of pressure on the upstream face thereof to the opposite wall of the chamber of the valve housing and thus prevent any substantial movement of the closed gate in the flow direction.

To unitize the seat-insert assembly the wear rings are completely surrounded on their circumferential surfaces with a layer of resilient, flexible, rubber-like material and these layers are integrated, across the bottom only, as seen in the several figures. Viewing the assembly in FIGURE 8 the two bands of elastic material are seen at 115 and 116 encircling the wear rings but permitting the bottom pins 102 to project through them so that the tapered end portion of these pins are at least partially exposed. In a like manner the upper pins or connectors are exposed, all except the lowermost and largest diameter proportions 104 thereof.

Figures 3, 6:
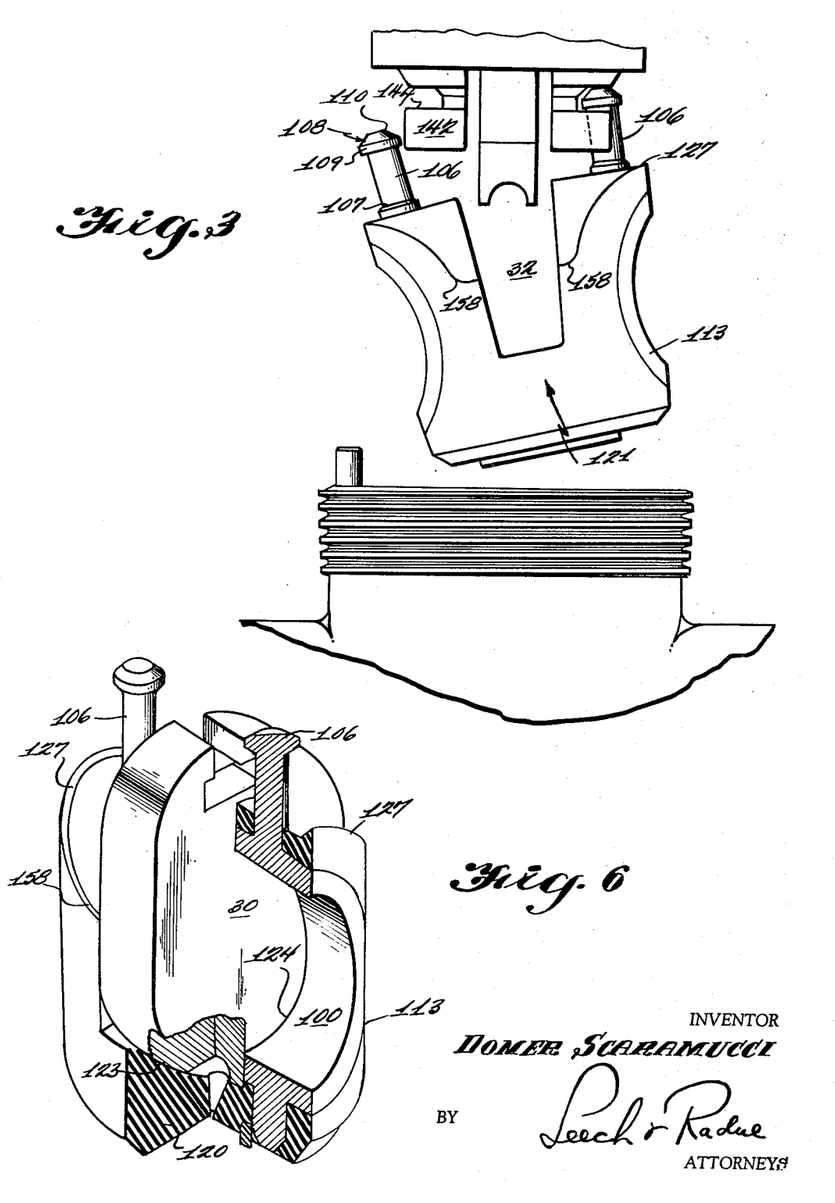
FIGURE 3 is a partial exploded view showing the seat-insert assembly in the process of being mounted on the bonnet for introduction into the body cavity.
FIGURE 6 is a perspective view, in half, longitudinal, vertical section, of the seat-insert assembly showing the gate in the closed position therein.

The material of the encircling bands 115 and 116 is thickened adjacent the bottom to fit the chamber 18, as seen at 120 in FIGURES 2 and 6 and the two rings are flexibly connected to each other by the material shown as 121 in FIGURE 8. This material extends in varying thickness between the positions indicated by the horizontal lines 122 seen in FIGURE 2 whereby to fill the bottom of chamber 18. Complete separation exists above these lines to form the slot into which fits the valve disc 30 the width of which is almost that of the chamber 18 as seen in FIGURE 2. Of course, between the lines 122, at the two sides of the insert, there is the connecting concave surface 123 seen in FIGURES 2 and 6, which has the same configuration as the lower edge 124 of the gate 30 as seen in FIGURE 6.

Figure 7:
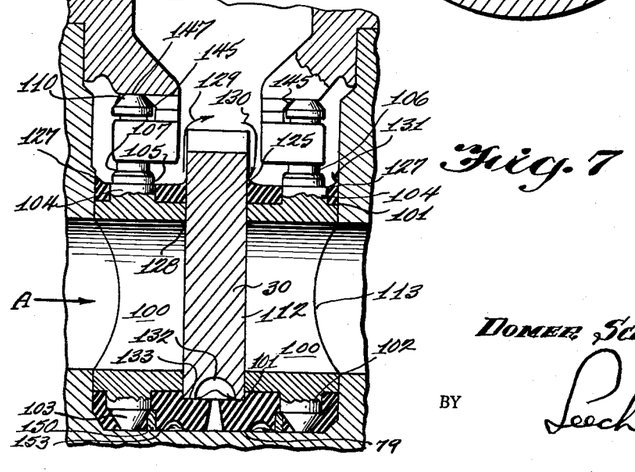
FIGURE 7 is a fragmentary longitudinal, central, vertical, section through the seat-insert assembly, the closed gate and the associated housing well-walls with flow arrows showing the pressure sealing action of the valve and seat-insert assembly.

As seen in FIGURE 8 the encircling bands 115 and 116 of elastic material which surround the metal wear rings 100 overlap the inner flat faces 111 of these rings resulting in the frusto-conical faces 125 which originate flush with the surfaces of the metal ends 100 and radiate outwardly and away from these ends. Thus the space between the properly positioned wear rings is lessened by the overhanging rubber so that when the gate 30 is forced into position by the action of the operating mechanism these lips 125 are forced radially outwardly, as shown in FIGURE 7 and extend along the faces 112 of the valve disc.

At the outer ends of the wear rings the rubber rings 115 and 116 are provided with relatively thin radially extending lips 127. When the assembly is seated in the well in the housing these extend up and along the walls thereof, as clearly seen in FIGURE 7. This figure has been used to illustrate the operation of the mud valve when subject to fluid pressure coming from the left as seen by arrow A. The fluid pressure is directed against the upstream face of the valve disc and, as the arrows 128 indicate, forces it slightly away from the left seat ring so that fluid passes outwardly as shown by the arrows 129 and downwardly as shown by the arrows 130 and 131 in an effort to enter between the downstream side of the valve disc and the seat assembly, but here as shown by the arrow 130, pressure is exerted on the now protruding lip 125 pressing it more tightly against the face of the disc, which is itself pressed against the surface 111 of the downstream wear element by the pressure of the fluid, so that no leakage occurs here. The same happens where the arrow 131 is indicated for the extending lip 127 is pressed more tightly against the chamber wall by the fluid, and thus leakage is prevented between the wear ring and the downstream passage 16 in the valve housing. At the bottom, tightness is achieved, without undue pressure on the disc, by urging it down against the curved surface 123 of the thickened portion of the rubber. In no sense is the disc forced into the resilient material to cause it to expand and produce tightness.

At this time it might be well to note the transverse groove 132 in the bottom of the valve disc, leaving only the narrow edges 133 thereof exposed at the bottom. This has two purposes, it permits these narrow edges to be pressed slightly into the resilient material with less effort and it provides for straddling any small gravel or stones which may have gotten into position in the gate slot when the gate was open. Under these circumstances they do not interfere with tight sealing.

Figure 4:
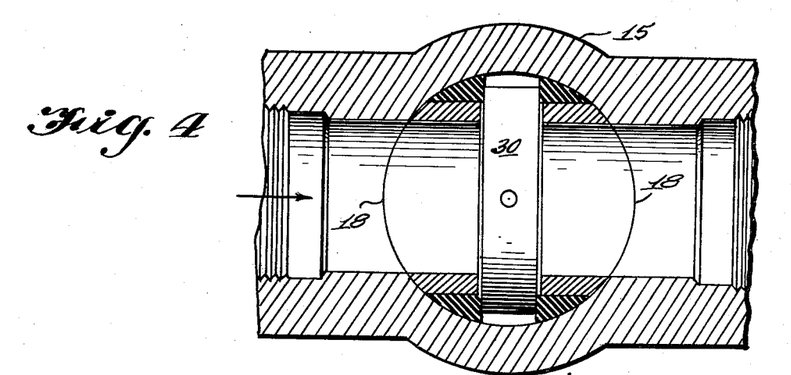
FIGURE 4 is a fragmentary horizontal section on the axis of the flow passage of the valve body showing the gate open, the section being taken on line 4—4 of FIGURE 1.
Figure 5:
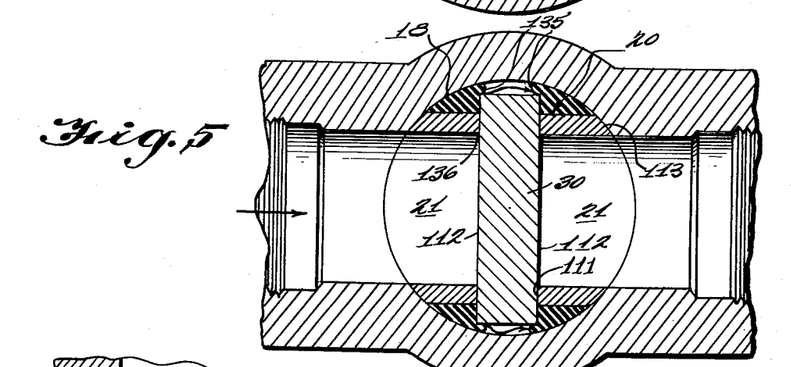
FIGURE 5 is a view similar to FIGURE 4 but showing the gate closed, with flow arrows indicating sealing action.

FIGURES 4 and 5 illustrate conditions, first, when the valve is opened and the flow is from the left and, second, when the valve is closed. On the horizontal plane through the passage bore center, where these views are taken, it will be clear that from FIGURE 4 there is a free passageway provided for the fluid while with the gate closed as in FIGURE 5 the force on the upstream side of the gate presses its downstream face 112 against the adjacent wear ring or metal insert. As the gate is moved downwardly it forces the resilient material, at the sides thereof and in position above the upper edges 122 of the connecting material 121, shown in FIGURE 8, and below the level of the lips 125 into the beads 135 (FIGURE 5), the one on the left, however, permitting the passage of fluid as indicated by arrow 136 while the one on the right is expanded by the pressure of this fluid and tightly seals against its entrance between the downstream face of the gate and the resilient material in the well in the lower portion of the valve housing.

When all of the lips and beads have been subject to considerable wear and the valve is showing some signs of leaking, added pressure on the gate causes volumetric deformation of the rubber beneath it, forcing it more tightly into position in the various sealing areas just referred to and materially extending the life of the seat-insert.

Referring now to FIGURE 3 which indicates the method of handling the seat-insert to join it to the bonnet whereby the two may be applied to the housing simultaneously, it will be seen that the posts 106, integral with the wear rings in the seat assembly, are adapted to be engaged in outwardly facing slots 140, seen best in FIGURE 1. These slots are arranged radially in the depending hooked leg devices 142 which are diametrically disposed in a plane at right angles to the center plane of the gate and integral with the bonnet 22. These hooks have flat top surfaces 144 to engage beneath the enlarged heads 108 on the pins 106 so as to withdraw the seat assembly from the well in the housing when the bonnet is removed. The pins are readily entered in the slots by expanding the seat assembly as seen in FIGURE 3 first one pin and then the other being entered in the manner shown. The pin and hook arrangement on the seat and bonnet serves to insure proper orientation of the seat bores 21 with the housing flow bores 16 for it will be remembered that the bonnet is indexed to the housing by pin 50 and slot 51.

As is seen in FIGURES 1 and 7, inclined surfaces 145 are provided on the body of the bonnet, just above the integral parts forming the hooks, which engage the conical upper ends of the pins so that as the bonnet is pressed down by tightening the clamping ring 34 the pins are spread laterally forcing the upper ends of the wear rings 100 in the seat assembly tightly against their seatings on the walls of the well. However, as soon as there is a slight lifting on the bonnet this pressure is removed and the wear rings are free to move inwardly toward each other releasing their tight engagement with the well walls and permitting more ready release of the seat assembly from the well. It will be clear that the tighter the clamping ring is screwed the more are the wear rings pressed outwardly to improve their fit with the well walls. Obviously, this operation could be achieved by properly shaping the lower ends of the hooks to co-operate with the chamfered edges of the enlargements at the bottom of the pins. In order that excess pressure may not be exerted laterally, the slots in which the pins slide have overhanging flat tops 147 which eventually engage the tops of the pins and transfer the load downwardly instead of outwardly where it is resisted by the pins 102 at the bottom engaging the bottom of the well.

In order that the lower parts of the wear rings and the assembled resilient material may be expanded as well as the tops, as just explained, an expansion ring 150 is provided integral with the seat assembly. This is a strong steel ring embedded in the thickened lower section of the rubber-like material and sized, positioned and of such thickness that the tapered walls 103 of pins 102 bear on it as the wear rings are forced downwardly under the action of the bonnet and are also spread by their conical surfaces sliding over the edge of the ring 150 to the maximum extent seen in FIGURES 1 and 7.

FIGURE 8 shows that, before installation of the seat, assembly ring 150 is forced downwardly a considerable distance below the plane of the bottom of the seat assembly by the resilience of the rubber-like material which is shaped to form a shallow cup 152 within the ring. As pressure is put on the seat assembly the thin portions 153 of the walls of this cup are moved upwardly along with the ring 150 to the position achieved in FIGURE 7. Under these circumstances the flat bottom 154 of the cup engages the bottom of the well and only a shallow circumferential groove 155, seen in FIGURE 1, is left for clearance.

Through the center of the connecting resilient material 121, between the two parts of the seat assembly, is provided a vertical passage 156 which serves to permit the release of any air or liquid trapped in the bottom of the well as the seat assembly is forced into position. On the reverse movement it prevents the formation of a vacuum beneath the seat assembly whereby it is much more readily withdrawn. The circular void and lip design within the spread-ring, as described above, acts to seal and exclude line fluid, entering the passage 156 along the upstream face of the gate from continuing to the downstream seating of the ring 100 against the chamber wall and thence into the passageway.

It will be observed that the valve seat assembly makes fluid-tight engagement to prevent passage of fluid along the downstream side of the gate, and through the downstream connection between the seat ring and the walls of the well in the housing. The lips 127 previously referred to follow the top outer contours of the assembly to points connecting the feathered-out gate cavity, as seen by the lines indicated at 158 in FIGURE 3 and perhaps more fully illustrated in FIGURE 6.

Since the insert assembly is molded to a cylindrical form to fit the chamber, it insures complete filling thereof laterally and the lips which follow the contours just defined provide those essentially continuous lines of contact to insure a fluid pressure responsive seal preventing fluid from the bonnet passing down the chamber walls. This, together with the tapered lip 125 which engages the downstream edge or face of the gate, insures against any leakage during operation. On the other hand, the recess or cavity formed to receive the lower end of the gate and extending between lines 122 on the two sides of the seat assembly extends below the metal seat rings and affords a continuous arcuate rubber ring to contact the lower face of the gate. With the gate on or near the bottom, a full ring of rubber makes a seal as explained above and shown in the several figures and, as the gate is finally closed, upstream fluid forces it against the downstream face and as fluid squeezes past the upstream face and into the bonnet, as well as into the gate cavity, a closure is effected by the opposite ends of the downstream rubber ring 116, which tests have shown to be positive once the gate face is lowered sufficiently to include a continuous circular wall of rubber, hence forceful jamming into the recess to secure lower side compressions and "squeeze off" is not necessary and, hence, the life of the elastic material in the seat assembly is substantially increased.

Certain modifications of various components of the valve seem indicated for specific uses, greater economy of construction or more facility of assembly under critical circumstances.

Thus in the large sizes, good practice dictates separate assembly of the valve seat insert and the bonnet since the sum of the weights of the components may exceed several hundred pounds and the bulk of the united parts will be considerable, making it extremely difficult to handle. Nevertheless co-operation between these two elements is essential after assembly not only to properly orient the valve seat combination, but to provide the necessary spread to insure the outer faces of the wear rings engaging the wall of the well in the housing while at the same time providing adequate clearance for the gate to enter the slot. Pressure must be maintained on the wear ring posts to insure maintaining the assembly in the well against the pressure of the flowing fluid.

The above objects can all be obtained by the simple expedient of omitting the heads from the tops of the stems 106 on the wear rings. Under these circumstances the hooks depending from the bonnet can slide down over the stems 106 after the seat assembly has been inserted in the well individually and manually. In removing the cylindrical head portions 109 the conical sections 110 are not eliminated since their co-operation with corresponding surfaces on the hook-bonnet assembly is essential in order to spread the wear rings so that their outer ends engage the walls of the well in the valve housing.

When the valve seat assembly is to be removed in the reversal of the insertion process the bonnet is separately taken from the assembly whereupon the valve seat assembly may be withdrawn with the use of the fingers or appropriate tools in the nature of hooks or the like reaching in through the gate slot and engaging the inner walls of the bores of the wear rings. It will be remembered from the preceding description that in the molding operation forming the rubber about the wear rings that they are normally positioned slightly closer together than desired in their final condition in order to facilitate insertion and withdrawal and are spread under the action of the co-operating conical heads and inclined surfaces on the hooks. Thus insertion and withdrawal are facilitated because the fit is not tight until the bonnet is pressed down.

Figures 9, 10:
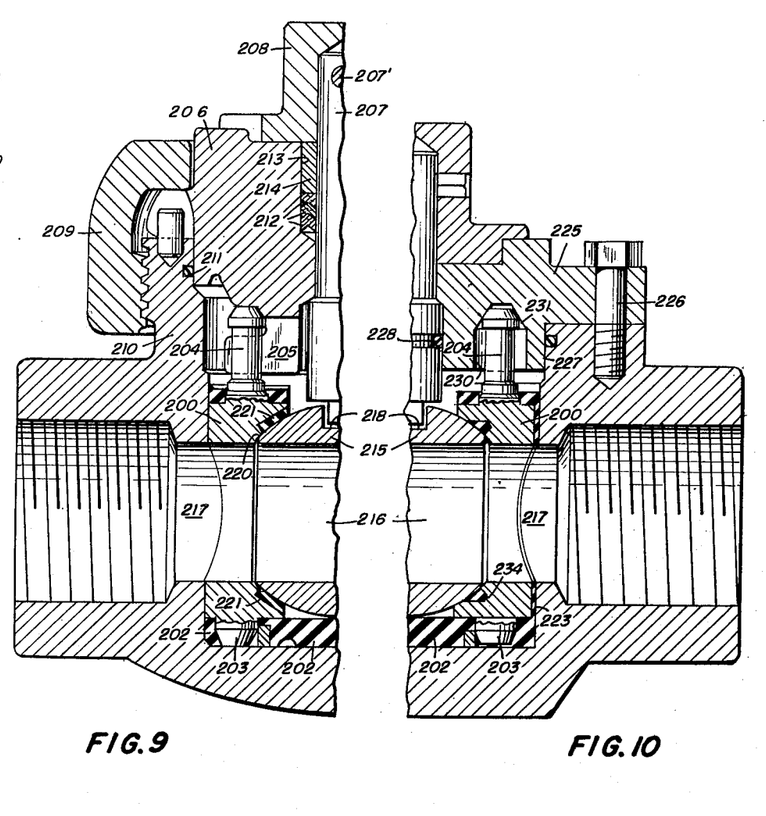
FIGURE 9 is a half vertical, longitudinal section of a modification making use of a ball type valve closure member and a simplified form of bonnet or cover member for the well in the valve housing.
FIGURE 10 is a view similar to that of FIGURE 9, but showing a further simplification in the cover member which engages the wear rings to hold the seat assembly in position and expanded but does not provide for removing it.
Figure 11:
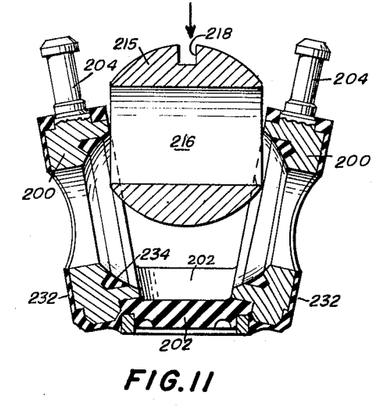
FIGURE 11 is a view of the seat assembly for a ball valve removed from the housing well and illustrating how it may be distorted for insertion of the valve ball in co-operative assembly therewith.

It will be remembered that in the preferred embodiment that the outer end wall 113 of each of the wear rings, which is curved to engage the wall of the chamber 118 in the valve body, required careful machining or grinding to insure accurate contact engagement in a fluid tight manner with the chamber wall. However, under certain circumstances it has been found that the construction can be simplified and cheapened by slightly shortening the wear rings and paying less attention to the exact shape and finish of the face 113. Then in molding the assembly the rubber-like material is caused to cover the end walls 113 with a layer of approximately $1/32$ of an inch thickness, as shown in FIGURES 10 and 11, which effects a close seal with the wall of the well.

The rubber-like covering over the end walls of the wear rings is deformable like the rest of the resilient material so that the rings are expanded by pressing down on the bonnet in a manner heretofore described this resilient material forms an adequate gasket or packing between the ends of the wear rings and the wall of the annular bore forming the well where it surrounds the fluid passages leaving the well and thus a second fluid-tight connection is affected over and above that achieved by the use of the radially extending lips 127 which are pressure sealed against the wall of the well.

The resilient coating avoids the need of precision machining of matching faces as well as precision in establishing the proper expansion at all of the wear ring projections and the coacting bonnet parts. Thus, tolerance can be given to over-expansion without subjecting the projections to stress distortion.

While the coating is only about $1/32$ of an inch thick it functions well as a gasket which the thrust imposed by the expansion members causes to conform to irregularities which may exist, and during service replacement handles the problem of sand and grit trapped at this point and tending to prevent positive seal.

Need for valves of this character exists in many sizes and obviously certain of the proposed modifications are more feasible in the larger sizes than the smaller ones and, hence, more desirable.

Successful operation of valves, constructed in accordance with the above disclosure, at full working pressure of the order of 3,000 pounds per square inch with well-drilling mud in actual operations have testified to the correctness of the theory of operation and the mechanical design.

FIGURE 9 illustrates a simplified embodiment of the invention incorporating a rotatable ball valve having a through-bore rather than the gate valve of the embodiment illustrated in FIGURES 1 through 8, inclusive. In this construction the other principal components do not differ substantially from those of the first embodiment and will not be described except to indicate differences. In this construction the composite valve seat assembly is composed of the two metal rings 200 embedded in a mass of resilient sealing material 202 which surrounds and joins them together at the bottom area as in the first embodiment. These rings are provided with the tapered pins 203 for expanding the lower portion when forced down over the rings, as in the first construction, and with the headed pins 204 engaged by the hooks 205 depending from the bonnet or cover member 206. Since the valve ball or plug is a rotatable type closure the bonnet does not have to have the depth of that in the first embodiment since it does not have to house the lifted valve gate and this permits a much shallower overall valve. Moreover, since there is no movement to the valve stem except rotary, this stem 207 which has its bearing in the bonnet 206 is quite short and projects but a small amount above the head of the bonnet and is there fitted with a cap 208 to receive a hand-wheel, crank or the like for effecting the 90 degree movement of the valve from open to closed position or vice versa.

The bonnet is held in position by means of a threaded collar 209 not substantially different from that shown in the first embodiment and the bonnet has a portion which fits within the spigot 210 and is sealed by the ring 211, as well as a flange to limit entry into the spigot. The rotary stem is provided with chevron packings 212 in a counterbore 213 and these may be held in place and compressed by bronze collar 214 which is engaged by the operating cap 208 secured to the stem by pin 207′. The previously described indexing mechanism may be provided to insure proper relative orientation of the bonnet in respect to the valve housing.

The valve ball 215 is just what its name implies, a substantially spherical member drilled at 216 for alignment with the bore 217 in the housing and coupled to the stem 207 by a screwdriver type of connection 218 which provides a small amount of lost motion to facilitate assembly. The valve member 215 can be a true sphere, if so desired, except for the areas cut out by the throughbore, and the metal thrust rings 200 have their confronting faces suitably configured to co-operate with the surface of the ball, i.e. they are parti-spherical as seen at 220.

A portion of this spherical surface 220 is removed and a packing material or ring 221 fitted into the area. In this particular embodiment it extends to the inner edge of the partispherical area and its inner face may protrude a little beyond the spherical surface on the wear ring in order that it be deformed when fitted against the ball. This provides the packing to prevent leakage between ball and ring and is adequate for all purposes except for extremely high pressures in which case the packing may be provided with a pressure sealed extending lip projecting partially over the surface of the ball in the manner of the lip illustrated at 125 in FIGURE 7 where it co-operates with the face of the disc or gate.

The embodiment of FIGURE 10 differs but little from that of FIGURE 9. The closure member or cover 225 for the valve housing is, however, a flat plate type secured down by stud bolts 226 threaded into portions of the main housing. It has a reduced diameter portion which fits within the bore 227 of the spigot. The valve stem is simpler and shorter than in FIGURE 9 and makes use of an O-ring packing 228 as shown. In this construction there are no hooks secured to the cover plate for lifting the valve seat assembly. There are only bores 230 greater in diameter than the heads on the studs 204 on the packing rings and these bores have conical ends 231 for engaging the heads of the studs and expanding the rings longitudinally so that they fit tightly against the walls of the well. They also apply pressure parallel to the axis of rotation of the ball to force the seat assembly tightly into its well. This construction reduces the overall height, again, since no provision need be made for hooks.

The rubber backing material which surrounds the metal rings 200 is, in this construction, extended over the outer ends of the rings as shown at 223 to save the necessity for machining and grinding them for an accurate, fluid tight, fit against the walls of the well. This thin layer of rubber or other flexible material of the order of ⅟₆₄ of an inch thickness absorbs any inequalities in the fit and insures tightness at less expense in manufacturing.

In this embodiment use is made of a different packing in the parti-spherical surface of each ring where it fits against the valve ball 215 which is identical in construction with the one illustrated in the embodiment of FIGURE 9. Here the packing material 234 is fitted into a groove of trapezoidal section, in what may be considered the center of the parti-spherical portion on the face of these rings, i.e. it is remote both from the edge which engages the ball and the edge which is formed by the fluid passage through the ring.

In the embodiments of FIGURES 9 and 10 the ball will be seen to rest at its bottom on the heavy mass of resilient packing material 202 which forms the connecting link, beneath the ball, between the packing material which surrounds each of the metal rings in the seat assembly.

A reference to FIGURE 11 when compared with FIGURE 3 indicates the versatility of applicant's valve seat assembly. Because of the rigid rings 200 of metal therein, which form the principal contact both with the walls of the well and the surface of the valving member, the outer ends, so to speak, of this unit are rigid but they are connected together at the bottom by resilient material as indicated by the reference character 202 which permits the upper ends to be spread sufficiently apart to facilitate the entry of the ball valve therein particularly over its shortest length resulting from the portions cut away by drilling the passage 216 therethrough. Thus, the valve obturating member or ball can be positioned by the operation illustrated in FIGURE 11 and when it is fully in place the parts can be drawn together, even if, for instance, they are to be hooked on hooks such as shown at 205 in FIGURE 9, and the assembly is ready for insertion into the well, it being remembered that it is sufficiently relaxed under these conditions so that no substantial force is required for the purpose. Thereafter when the bonnet or closure member is placed over the spigot on the body and drawn down by either the rotatable collar 209 or the studs 226 the metal tubes forming parts of the seat unit are spread apart by the action heretofore explained and a tight fit made with the walls of the well. The ball will always be pressed against the downstream seat by the action of pressure fluid on its upstream end to keep it tight, especially when closed, and this tightness is facilitated by the provision of the packing ring 221 of FIGURE 9 or that numbered 234 in FIGURE 10. FIGURE 11 shows the form of packing ring 234 of FIGURE 10 and likewise illustrates quite well the packing 232 on the outer ends of the metal rings 200 to insure their tightness against the walls of the well.

This application is a continuation-in-part of my copending application Serial No. 671,555 for "Mud Valve," filed July 12, 1957, now abandoned.

I claim:

1. A valve of the type described including in combination a housing having a flow passage therethrough and a chamber for a valve closure member intersecting said passage, a valve closure member of the gate type reciprocable in said chamber to close or open said passage, a unitary valve seat-insert in the said chamber having a bore aligned with said flow passage and a slot aligned and fitted to said gate, said insert including a metal tube extending between each slot wall and the adjacent chamber wall, and an enveloping mass of resilient material engaging the walls of said chamber and the faces of the gate when closed, and extending circumferentially about the tubes, said material extending integrally beneath the gate and there engaging the chamber bottom, and means independent of said gate and of the resilient material to expand said valve seat insert metal tubes in said chamber in the direction of length of said flow passage.

2. A valve of the type described including in combination a housing having a flow passage therethrough and a chamber for a valve closure assembly intersecting the passage, a flat disc valve gate reciprocable axially in said chamber to close or open said passage, and a unitary valve seat assembly filling said chamber about the faces and bottom edge of said gate, a bonnet to close the said chamber, means to attach the bonnet to the housing and means detachably connecting said bonnet and complete seat assembly.

3. The valve of claim 2 in which said detachable connecting means includes means to positively expand said seat assembly in said chamber in the direction of the axis of said flow passage.

4. The valve of claim 2 in which said seat assembly includes elastic material and is provided with means therein to expand the assembly axially of said flow passage on pressure from said bonnet axially of said chamber, and means to advance said bonnet in said axial direction of said chamber.

5. A valve of the type described including in combination a housing having a flow passage therethrough, a chamber having a closed bottom arranged with its axis intersecting the flow passage axis at right angles, a bonnet for closing the top of said chamber, means to index the bonnet and housing for one-relation assembly, means securing the bonnet to the housing, an integrated valve seat unit shaped and sized to fill said chamber and define an intermediate portion of said flow passage, a valve gate reciprocable from bonnet to chamber, a slot in said seat unit to receive said gate to close said passage and readily separable means connecting said bonnet and seat unit for insertion, removal and orientation of said seat unit.

6. The valve of claim 5 in which the chamber is cylindrical and the seat unit includes two tubular metal wear rings having facing end walls coincident with the walls of said slot and curved end walls to engage the chamber walls and complete the said flow passage, the cylindrical outer walls of said rings being encased in a single unitary mass of resilient material extending between said rings beneath said slot to connect them together and fully cover said chamber.

7. The valve of claim 6 in which the bonnet, seat-unit connecting means includes co-operating post and hook elements on the wear rings and bonnet.

8. The valve of claim 7 in which the bonnet is adjustable in respect to the valve housing toward said seat-unit, and co-operating surfaces on said posts and hooks arranged to spread said wear rings for tight engagement with the chamber walls on movement of the bonnet toward said chamber.

9. The valve of claim 8 in which said seat unit incorporates means engageable with the chamber bottom wall and means integral with the wear rings, said last two mentioned means having engaging surfaces adapted to spread the wear rings on movement of the latter toward the chamber bottom under the action of bonnet movement transmitted through the hooks and posts.

10. The valve of claim 9 in which said means engageable with the chamber bottom wall is incorporated in the resilient material of the seat-unit, said material being arranged to extend said means below the plane of the unit bottom when relaxed.

11. The valve of claim 10 in which said means engageable with the chamber bottom wall is a metal spreader ring, the resilient material within the spreader ring having a passage therethrough from the bottom to the valve gate engaging surface of the material between the wear rings for pressure relief when installing or removing the insert from the chamber, and a circular lip integral with said resilient material and positioned within said spreader ring to make fluid tight engagement with the said chamber to seal off the said passage from seepage between the surface of the seat unit and the chamber walls.

12. In a gate valve, in combination, a housing having a fluid passage intersecting a closed bottom, seat-unit receiving well, a seat-unit in said well having metal wear rings completing said fluid passage and spaced apart to provide a slot, a thick gate adapted to enter said slot to close said passage, resilient material encasing said rings and connecting them together below said slot, said connecting material providing a seat for the bottom of said gate, said gate comprising a metal disc having substantially flat side and bottom walls and a channel in the lower portion of said gate extending transverse to said passage whereby two spaced narrow edges are presented to said connecting resilient material to straddle small particles, debris and the like remaining in the lower portion of said slot on said resilient material and to better be pressed into the material to insure fluid tightness.

13. In a valve of the type described, in combination, a unitary valve body having a straight flow passage therethrough, a closed bottom well in said body larger than and intersecting said passage at right angles, a spigot extending said well above said body, a composite valve seat-unit adapted to be inserted in said well through said spigot and including spaced metal wear rings aligned with said passage and enveloping resilient packing material filling the well, a closure member adapted for attachment to the valve body and having a portion entering said spigot, pins integral with said wear rings projecting through said said packing material to be engaged by said closure member to hold the valve seat-unit in position in the well, and a valve member operable in said body and seat-unit between said wear rings to control flow through said passage.

14. The valve of claim 13 in which said engaging portion of said closure and the valve seat-unit pins are arranged with opposite inclined faces to expand the seat into close engagement with the well walls on downward movement of the closure, and the resilient packing material integral with said seat-unit being so constructed as to contact the same to facilitate its removal from the well.

15. A gate valve including in combination, a unitary housing having a straight flow passage therethrough, an open top well larger than said passage, intersecting it at right angles, and having side and bottom walls, a bonnet adapted to close said well and adjustable toward said bottom wall, a gate valve disc having an operating stem extending through said bonnet, a composite valve seat assembly sized to loosely fit said well, means on said bonnet to engage said assembly to hold it in the well, said assembly including rigid wear rings both sized to form extensions of said passage and being of such length and so positioned that when extended their inner ends are spaced apart to just receive said gate and their outer ends are sealed to the side well walls, said rings being embedded in a single mass of resilient material shaped when relaxed to loosely fit said well walls for their full perimeter and to substantially cover said bottom wall, and slotted to receive said gate to at least the depths of the rings but above said well bottom wall, said slot dividing the mass into two bottom connected portions each surrounding a wear ring and when relaxed holding them to narrow said spacing and slot, and means on the rings co-operating with a well wall and the bonnet to extend the wear rings oppositely to widen said slot and seal their outer ends to the flow passage.

16. The gate valve as defined in claim 15 in which the gate has flat walls and the inner ends of the rings are flat to engage them, the material of said mass covering the rings circumferentially and extending outwardly from the whole circumference of the outer edges of said ring inner ends in hollow truncated conical surfaces, the outer edges of which are spaced apart less than the distance between gate faces when the insert is expanded and said outer edges are expanded by the gate when inserted to provide lips lying along the gate's faces above the insert to be pressure held thereagainst.

17. The gate valve as defined in claim 15 in which movement of the wear rings toward the well bottom wall on engagement by the bonnet produces the axial movement of the wear rings.

18. The gate valve as defined in claim 17 in which the wear ring movement toward the well bottom wall expands the resilient mass to closely engage the well side walls about the ends of the wear rings and to engage the gate walls about the inner ends of the wear rings.

19. In a valve of the type described, in combination; a valve body having a flow passage therethrough; a closed bottom well in said body opening through the top thereof and intersecting said passage; a composite valve seat-unit adapted and sized to be loosely inserted in said well through the open top and including two metal wear rings for alignment with said passage, spaced on either side of a slot, and a mass of resilient material surrounding each ring and integrated beneath the rings and slot to engage and substantially fill the well bottom; a bonnet mounted to close the well; a valve member; means to actuate the valve member; said resilient material when relaxed reducing the slot width for easy insertion of the seat-unit, means actuated by movement of the bonnet toward well closing position to move said wear rings apart and expand the resilient material to fill at least the lower part of the well.

20. In a valve of the type described, in combination; a valve body having a flow passage therethrough; a closed bottom well in said body opening through the top thereof and intersecting said passage; a composite valve seat-unit adapted and sized to be loosely inserted in said well through the open top and including two metal wear rings for alignment with said passage, spaced on either side of a slot, and a mass of resilient material surrounding each ring and integrated beneath the rings and slot to engage and substantially fill the well bottom; a bonnet mounted to close the well; a valve member; means to actuate the valve member; said resilient material when relaxed reducing the slot width for easy insertion of the seat-unit; and two diametrically opposite wedge surfaces integral with each wear ring, co-operating wedge surfaces in the housing and means to provide relative movement of the first and second wedge surfaces by advancing the bonnet to close the well whereby the wear rings are forced to seal the rings to the well walls.

21. In a valve of the type described, in combination; a valve body having a flow passage therethrough, a closed bottom well intersecting said passage and having side walls extending laterally beyond the passage, a composite seat-unit sized for loose insertion into said well and comprising rigid seat bearing tubes spaced on either side of a slot for alignment with said passage, resilient means surrounding said tubes, coupling them together below said passage and substantially filling said well, a bonnet adapted for attachment to the valve body to close the well and arranged to engage and hold the seat-unit in the well, a valving member operable in said well and between said tubes and means to tighten the bonnet against the seat unit to expand the resilient means to seal against the well bottom and walls.

22. A valve of the type described including in combination, a housing having a flow passage therethrough and a closed bottom chamber for a valve closure member intersecting said passage; a valve closure member operable in said chamber to control the flow passage; a unitary valve seat-insert in said chamber having a bore aligned with the flow passage and having a slot having walls conforming to the closure surface, said insert including a metal tube forming said bore and extending from each slot wall toward the adjacent chamber wall, and an enveloping mass of resilient material engaging the walls of said chamber and the closure member, extending circumferentially about the tubes and integrally beneath the closure member and there engaging the chamber bottom; and means independent of said closure member and of the resilient material to move said valve seat insert metal tubes in the chamber each toward the nearest chamber wall.

23. A valve of the type described including in combination, a housing having a straight flow passage therethrough and a closed bottom chamber intersecting the passage at right angles and extending above and below it to provide for a valve closure assembly; a valve closure member operable in said chamber to close or open said passage; a unitary valve seat assembly filling said chamber to the bottom thereof and extending about and engaging surfaces of said valve closure member for sealing therewith, a cover member for closing the chamber, means to attach the cover member to the housing, and means detachably connecting said cover member and complete seat assembly for withdrawal of the latter from said chamber.

24. In a valve of the type described in combination a unitary valve body having a straight flow passage therethrough, a closed bottom well in said body larger than and intersecting said passage at right angles, a composite valve seat-unit adapted to be inserted in said well through the open top and including spaced metal wear rings aligned with said passage and enveloping resilient packing material sized to fill the lower part of said well, a closure member adapted for attachment to the valve body and having a portion entering said well, a pin for each wear ring projecting through said packing material for engagement by said closure member in said well to hold the valve seat-unit in position, and a valve closure member operable in said body and seat-unit between said wear rings to control flow through said passage.

25. A ball valve including in combination a unitary housing having a straight flow passage therethrough, an open top well larger than said passage, intersecting it at right angles, and having side and bottom walls, a closure member adapted to close said well and adjustable toward said bottom wall, a valve ball bored for alignment with the flow passage, an operating stem for said ball extending through said closure, a composite valve seat assembly sized to loosely fit in said well, means on said closure to engage said assembly to hold it in the well, said assembly including two rigid wear rings sized to form extensions of said passage and being of such length and so positioned as to extend substantially from ball surface to well side wall, said rings being embedded in a single mass of resilient material shaped when relaxed to loosely fit said well walls for their full perimeter and to substantially cover said bottom wall, said material between the planes of the inner faces of the wear rings being slotted from the top toward the bottom wall to divide the mass into two bottom connected portions each surrounding a wear ring to provide for separating said inner faces to receive the valve ball prior to insertion of the seat assembly into the well.

26. The combination of claim 25 in which the inner face of each wear ring is parti-spherical to mate with the ball surface, a circular channel in each said inner face and a ring of resilient material in each channel to seal against the ball surface.

27. A valve, comprising a housing having a straight flow passage therethrough and an open top well larger than said passage intersecting the passage at right angles, a bottom closure wall for said well, a top closure member adapted to close said well, a valve member for closing the flow passage, an operating stem for said valve member extending through said closure member, a composite valve seat assembly sized to loosely fit in said well, means on said top closure to engage said assembly to hold it in the well, said assembly including two rigid wear rings sized to form extensions of said passage and being each of such length and so positioned as to extend substantially from a valve member surface to a well side wall, said rings being embedded in a single mass of resilient material shaped when relaxed to loosely fit in said well and to substantially cover said bottom wall, said resilient material being extended over the ends of the rigid wear rings adjacent said well walls, said material between the inner faces of the wear rings being slotted from the top toward the bottom wall to divide the mass into two bottom-connected portions each surrounding a wear ring to provide for separating said inner faces to receive the valve member prior to insertion of the seat assembly into the well.

28. A gate valve comprising a valve housing having inlet and outlet flow passages communicating at their inner ends with an enlarged upwardly opening chamber, a bonnet detachably secured to said housing to close said chamber, a stem mounted on said bonnet for reciprocating movement toward and away from said chamber, a gate mounted on the lower end of said stem for movement into and out of said chamber and for movement axially of said flow passages in response to line pressure, and a valve seat assembly adapted to be removably mounted in said chamber to receive the gate and provide seats between the gate and the walls of the chamber around the inner ends of the inlet and outlet flow passages, said valve seat assembly including a metal reinforcing ring surrounding the inner end of said outlet flow passage to limit the axial movement of the gate toward the outlet flow passage but having a length less than the space between the gate and the walls of the chamber around the outlet flow passage when the gate is initially inserted in the seat assembly and not subjected to line pressure, a resilient seal ring bonded around the metal reinforcing ring having a continuous annular lip on the inner end thereof extending inwardly of the inner end of the metal reinforcing ring and engageable with the adjacent side surface of said gate, the undeformed length of said sealing ring including said lip being greater than the space between the side surface of said gate and the wall of said chamber around the inner end of the outlet flow passage when the gate is initially inserted in said seat assembly and not subjected to line pressure, whereby said lip is initially deformed by said gate and as said gate is moved to a closed position said gate is moved in a downstream direction by line pressure against the reinforcing ring and said lip of the sealing ring is further deformed by the gate.

29. A gate valve comprising a valve housing having inlet and outlet flow passages communicating at their inner ends with an enlarged upwardly opening chamber, a bonnet detachably secured to said housing to close said chamber, a stem mounted on said bonnet for reciprocating movement toward and away from said chamber, a gate mounted on the lower end of said stem for movement into and out of said chamber and for movement axially of said flow passages in response to line pressure, and a valve seat assembly adapted to be removably mounted in said chamber to receive the gate and provide seats between the gate and the walls of the chamber around the inner ends of the inlet and outlet flow passages, said valve seat assembly including metal reinforcing rings on opposite sides of said chamber around the inner ends of the inlet and outlet flow passages to limit the axial movement of the gate, each of said metal reinforcing rings having a length less than the space between the gate and the walls of the chamber around the inner ends of the respective flow passage when the gate is initially inserted in the seat assembly and not subjected to line pressure, a single mass of resilient material bonded around the metal reinforcing rings to form seal rings around the inner ends of the inlet and outlet flow passages and to form a bridge of resilient material between the seal rings at the bottom of said chamber below the metal reinforcing rings, each of said seal rings having an annular lip extending inwardly of the inner end of the respective metal reinforcing ring for engagement with the respective side of the gate as the gate is inserted in the seat assembly, the undeformed length of each of said seal rings including the respective lip being greater than the space between the respective side of the gate and the adjacent walls of said chamber, whereby said lips are deformed when the gate is initially inserted in the seat assembly and said lip on the seal ring around the inner end of the outlet flow passage is further deformed when the gate is fully closed and moved toward the outlet flow passage by line pressure.

30. A gate valve as defined in claim 29 wherein the portions of said lips above said bridge are deflected radially outward from the respective seal rings, whereby said portion of the lip on the seal ring around the inner end of the outlet flow passage will be further deformed against the respective side of the gate by the pressure of fluid leaking past the gate into said chamber.

References Cited in the file of this patent

UNITED STATES PATENTS

| | | |
|---|---|---|
| Re. 24,102 | Ohls | Dec. 13, 1955 |
| 953,100 | Nelson | Mar. 29, 1910 |
| 1,039,059 | Howard et al. | Sept. 17, 1912 |
| 1,898,935 | Brandriff | Feb. 21, 1933 |
| 2,173,381 | Waddell | Sept. 19, 1939 |
| 2,235,306 | Atkinson | Mar. 18, 1941 |
| 2,606,740 | Allen | Aug. 12, 1952 |
| 2,643,679 | Klammerer | June 30, 1953 |
| 2,705,019 | Volpin | Mar. 29, 1955 |
| 2,731,231 | Garrott | Jan. 17, 1956 |
| 2,765,143 | Best | Oct. 2, 1956 |
| 2,815,187 | Hamer | Dec. 3, 1957 |
| 2,816,730 | Rabas | Dec. 17, 1957 |
| 2,873,085 | Allen | Feb. 10, 1959 |

FOREIGN PATENTS

| | | |
|---|---|---|
| 8,986 | Great Britain | June 14, 1884 |
| 2,757 | Great Britain | Dec. 21, 1889 |
| 693,257 | Great Britain | June 24, 1953 |
| 749,932 | Great Britain | June 6, 1956 |